R. W. E. MOORE & H. R. EDGECOMB.
HARDNESS TESTING APPARATUS AND METHOD.
APPLICATION FILED MAY 4, 1915.
1,192,670.
Patented July 25, 1916.
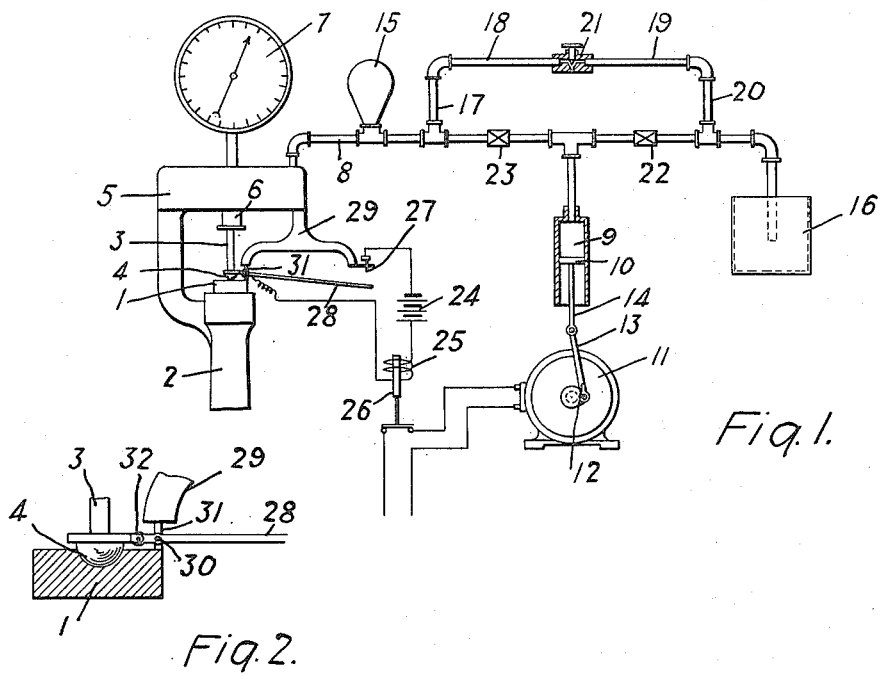
Fig. 1.
Fig. 2.
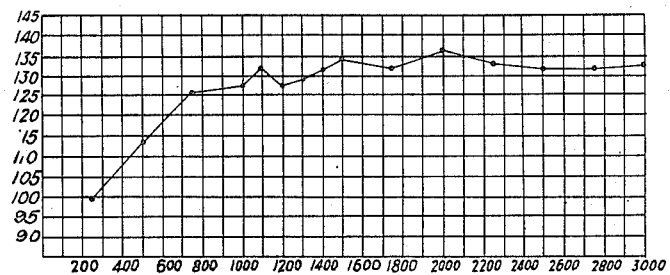
Fig. 3.
WITNESSES:
INVENTORS
Ralph W. E. Moore &
Henry R. Edgecomb.
BY
ATTORNEY

UNITED STATES PATENT OFFICE.

RALPH W. E. MOORE AND HENRY R. EDGECOMB, OF WILKINSBURG, PENNSYLVANIA, ASSIGNORS TO WESTINGHOUSE ELECTRIC AND MANUFACTURING COMPANY, A CORPORATION OF PENNSYLVANIA.

HARDNESS-TESTING APPARATUS AND METHOD.

1,192,670.  Specification of Letters Patent.  Patented July 25, 1916.

Application filed May 4, 1915. Serial No. 25,817.

*To all whom it may concern:*

Be it known that we, RALPH W. E. MOORE and HENRY R. EDGECOMB, citizens of the United States, and residents of Wilkinsburg, in the county of Allegheny and State of Pennsylvania, have invented a new and useful Improvement in Hardness-Testing Apparatus and Methods, of which the following is a specification.

Our invention relates to apparatus and methods for determining the relative hardness of metals and other materials, and it has special reference to hardness-testing methods that depend upon forming surface indentations in the material to be tested and determining the ratio between the areas of such indentations and the pressure necessary to form them.

One object of our invention is to provide a method of the above indicated character by which the hardness of solid materials may be ascertained with great accuracy and which will give concordant results upon different materials and upon different samples of the same material.

Another object of our invention is to provide convenient and accurate apparatus for carrying out the foregoing process.

In the accompanying drawing, which shows one form of machine adapted for use in practising our process, Figure 1 is a diagrammatic view showing a hardness-testing machine embodying the principles of our invention, including motor-operated pressure applying means and an electrical control system. Fig. 2 is a side view, partially in elevation and partially in section, of certain details of the apparatus shown in Fig. 1. Fig. 3 is a diagram showing a curve that illustrates one of the advantages of our hardness-testing method.

The hardness of metals and other penetrable substances is commonly determined by means of the Brinell method, which consists in applying a constant pressure to a steel ball of a given diameter in contact with the material to be tested and then measuring the area of the indentation which this ball makes in the test material. The relative hardness of the material is expressed by a number which is the ratio between the applied pressure and the area of the indentation. Ordinarily, this ratio is expressed in kilograms per square millimeter. It has been found, in practice, that the varying depressions made by the impression member or ball do not give uniform results because, when the ball is forced to different depths in the test materials, the materials are not displaced in exact proportion to the applied force. A certain amount of material always builds up in a ridge around the edge of the depression and this ridge is proportionally greater as the depth of the depression increases. The areas of the depressions produced by the usual methods are therefore not in exact ratio with the real hardness of the materials tested. It is also found that, if different loads are employed in making depressions upon the same material having uniform hardness, the numerical hardness is different for the different loads which have been used on the ball on account of the different depths of the depressions. This is illustrated in Fig. 3 of the accompanying drawings, which shows a curve of coördinates expressing the results of a series of tests upon a uniform piece of hard steel, in which the ordinates are Brinell hardness numbers and the abscissas are applied pressures in kilograms. It will be observed that the results are very discordant in the range of pressures between 250 kilograms and 1500 kilograms and that between 1500 kilograms and 3000 kilograms, the results are more nearly, but not quite, uniform.

According to our present invention, we avoid the foregoing disadvantages of the useful hardness-testing methods by always producing depressions of equal areas in the test-pieces and determining their relative hardness by observing the different pressures required to produce such uniform depressions. The area of the depressions to be selected should be such that a substantially constant ratio exists between the area and the applied pressure and we have found that a diameter of about 3½ millimeters give the best results.

Referring to the structure shown in Figs. 1 and 2 of the drawing, a block 1 of material to be tested is shown supported on a suitable standard 2 in operative relation to a vertically movable plunger 3 which carries, at its lower end, a hard steel hemisphere 4 or other suitable impression device. Any suitable means may be provided for applying pressure at a constant rate to the plunger 3. In the structure shown, this pressure-applying means comprises a pressure chamber 5 provided with a gland 6 for receiving the plunger 3 and also provided with a pressure indicator 7. Fluid pressure is supplied to the chamber 5 through a pipe 8 by means of a pump 9, the piston 10 of which is reciprocated by means of an electric motor 11 through a crank 12, a pitman 13 and a piston rod 14. If desired, an auxiliary air chamber 15 may be inserted in the pipe 8 in order to maintain the pressure on the plunger constant during the operation of the pump, and oil, or other suitable fluid, is drawn by the pump from a reservoir indicated at 16. In order to regulate the rate at which pressure is applied to the plunger, a by-pass should be placed in the fluid system and provided with a needle valve for regulating the effective pressure delivered to the plunger. As shown, such by-pass is formed by pipes 17, 18, 19 and 20 and a needle valve 21 is interposed between the pipes 18 and 19. Suitable check valves 22 and 23 may be placed in the suction and delivery pipes, respectively, of the pump 9.

In order to stop the motor 11 when the impression member 4 has penetrated the desired distance into the test-piece 1, we provide a relay-operating control circuit for interrupting the supply of energy to the motor, the control circuit being closed when the member 4 has advanced the required distance. As diagrammatically shown in Fig. 1, this control circuit comprises a battery 24, a solenoid coil 25 energized by the battery 24 and operating a relay core 26, a fixed contact member 27 electrically connected to one terminal of the battery 24 and a pivoted contact member 28 that is electrically connected to the solenoid coil 25. The contact members 27 and 28 are supported by a stationary bracket 29 attached to the frame of the pressure chamber 5, and the contact member 28 is pivoted at 30, as best shown in Fig. 2, to an extension 31 of the bracket 29. The extension 31 is adapted to rest upon the test-piece 1 for steadying purposes and so that the test piece may be adjusted vertically into proper relation to the plunger and to the contact-making device, and the shorter arm of the pivoted contact member 28 is loosely connected at 32 to the plunger 3. According to the desired area of the depressions to be produced by the impression member 4, the contact member 27 may be vertically adjusted to permit the impression member 4 to penetrate the test-piece 1 to a greater or less degree before the control circuit is closed by the engagement of the pivoted contact member 28 with the contact member 27. When this engagement occurs, the battery circuit is completed and the solenoid coil 25 raises the relay core 26, thus interrupting the motor circuit and stopping the machine. The indicator 7 is preferably graduated directly in hardness numbers, which, as stated above, represent the ratio between the areas of the depressions made by the member 4 and the applied pressures.

The structural details which we have shown and described are merely illustrative, and the principles of our invention may be embodied in many other equivalent devices. It is therefore to be understood that our invention comprehends all such variations in structure and process steps as fall within the scope of the appended claims.

We claim as our invention:

1. The method of testing the hardness of metals and the like that comprises pressing an impression member of symmetrical contour into the material to form an indentation of predetermined area, and measuring the pressure necessary to make such indentation.

2. The method of testing the hardness of metals and the like, by forming surface indentations in the materials to be tested, that comprises determining by a series of preliminary tests upon a given class of material the indentation area that gives a substantially uniform ratio between the area of the indentation and the applied pressure, forming an indentation of the selected area in the material to be tested, and measuring the pressure necessary to make such indentation.

3. A hardness-testing machine comprising means for supporting a sample of material to be tested, means for forcing an impression member of predetermined contour, a predetermined distance into the said sample and for thereby forming an indentation of predetermined area therein, and means for indicating the pressure required to make the said impression.

4. A hardness-testing machine comprising means for supporting a sample of material to be tested, means for forcing a spherical impression member a predetermined distance into the said sample, and means for indicating the ratio between the area of the impression so produced and the pressure required to make the said impression.

5. A hardness-testing machine comprising means for supporting a sample of material to be tested, means for forcing an impression member into the said sample with increasing force, and means for stopping such increase of force when the said member has penetrated the said sample to a predetermined distance.

6. A hardness-testing machine comprising means for supporting a sample of material to be tested, means for forcing an impression member into the said sample with increasing force, and electrically operated means for stopping such increase of force when the said member has penetrated the said sample to a predetermined distance.

7. A hardness-testing machine comprising means for supporting a sample of material to be tested, means for forcing an impression member of symmetrical contour a predetermined distance into the said sample, and an indicator operating in proportion to the pressure applied to the said impression member, the said indicator being graduated in figures that express the ratio between the area of the indentation produced by the said impression member and the pressure required to make such impression.

8. A hardness-testing machine comprising means for supporting a sample for material to be tested, fluid-operated pressure means for forcing an impression member into the said sample with increasing force, a motor-operated pump for applying fluid pressure to the said impression means, and means for automatically stopping the said motor when the said member has penetrated the said sample to a predetermined distance.

In testimony whereof, we have hereunto subscribed our names this 29th day of April, 1915.

RALPH W. E. MOORE.
HENRY R. EDGECOMB.